(12) United States Patent
Cook et al.

(10) Patent No.: US 9,647,971 B2
(45) Date of Patent: *May 9, 2017

(54) AUTOMATIC DELIVERY SELECTION FOR ELECTRONIC CONTENT

(71) Applicant: ZixCorp Systems, Inc., Dallas, TX (US)

(72) Inventors: David P. Cook, Dallas, TX (US); Gary G. Liu, Plano, TX (US); John Kalan, Dallas, TX (US)

(73) Assignee: ZixCorp Systems, Inc., Dallas, TX (US)

(*) Notice: Subject to any disclaimer, the term of this patent is extended or adjusted under 35 U.S.C. 154(b) by 88 days.

This patent is subject to a terminal disclaimer.

(21) Appl. No.: 14/635,975

(22) Filed: Mar. 2, 2015

(65) Prior Publication Data
US 2015/0244663 A1 Aug. 27, 2015

Related U.S. Application Data

(63) Continuation of application No. 10/397,064, filed on Mar. 24, 2003, now Pat. No. 8,972,717, which is a
(Continued)

(51) Int. Cl.
*H04L 12/58* (2006.01)
*G06Q 10/10* (2012.01)
(Continued)

(52) U.S. Cl.
CPC .............. *H04L 51/12* (2013.01); *G06F 21/60* (2013.01); *G06Q 10/107* (2013.01); *H04L 12/58* (2013.01); *H04L 51/34* (2013.01); *H04L 63/0442* (2013.01); *H04L 63/083* (2013.01); *H04L 63/0823* (2013.01); *H04L 63/12* (2013.01); *H04L 63/123* (2013.01); *H04L 63/126* (2013.01); *H04L 69/08* (2013.01);
(Continued)

(58) Field of Classification Search
CPC ...... H04L 12/58; H04L 12/583; H04L 12/587
See application file for complete search history.

(56) References Cited

U.S. PATENT DOCUMENTS

| 4,458,109 A | 7/1984 | Mueller-Schloer |
| 5,022,080 A | 6/1991 | Durst et al. |

(Continued)

FOREIGN PATENT DOCUMENTS

| EP | 0 838 774 | 4/1998 |
| EP | 0 869 652 | 10/1998 |

(Continued)

OTHER PUBLICATIONS

Canadian Office Action in Application No. 2,461,061, dated Nov. 15, 2011, 2 pages.
(Continued)

*Primary Examiner* — Ellen Tran
(74) *Attorney, Agent, or Firm* — Fish & Richardson P.C.

(57) ABSTRACT

Computer program products and methods for the secure delivery of a message in a communication system. The method includes identifying a best method for delivery of a message including considering preferences of a sender and a recipient and sending the message from the sender to the recipient using the identified method.

10 Claims, 4 Drawing Sheets

Related U.S. Application Data continuation-in-part of application No. 09/595,416, filed on Jun. 15, 2000, now Pat. No. 6,732,101.

(51) Int. Cl.
*H04L 29/06* (2006.01)
*G06F 21/60* (2013.01)

(52) U.S. Cl.
CPC .......... *H04L 12/585* (2013.01); *H04L 12/587* (2013.01); *H04L 12/5835* (2013.01); *H04L 51/066* (2013.01)

(56) References Cited

U.S. PATENT DOCUMENTS

| | | | |
|---|---|---|---|
| 5,136,646 A | 8/1992 | Haber et al. | |
| 5,136,647 A | 8/1992 | Haber et al. | |
| 5,278,984 A | 1/1994 | Batchelor | |
| 5,509,000 A | 4/1996 | Oberlander | |
| 5,513,126 A | 4/1996 | Harkins et al. | |
| 5,535,276 A | 7/1996 | Ganesan | |
| 5,539,826 A | 7/1996 | Dwork et al. | |
| 5,615,268 A | 3/1997 | Bisbee et al. | |
| 5,621,727 A * | 4/1997 | Vaudreuil | H04L 12/583 370/401 |
| 5,638,446 A | 6/1997 | Rubin | |
| 5,682,460 A | 10/1997 | Hyziak et al. | |
| 5,689,642 A | 11/1997 | Harkins | |
| 5,712,907 A | 1/1998 | Wegner et al. | |
| 5,790,790 A | 8/1998 | Smith et al. | |
| 5,870,549 A | 2/1999 | Bobo, II | |
| 5,940,834 A | 8/1999 | Pinard et al. | |
| 5,944,786 A | 8/1999 | Quinn | |
| 6,023,700 A * | 2/2000 | Owens | G06Q 10/107 |
| 6,061,448 A | 5/2000 | Smith et al. | |
| 6,081,899 A | 6/2000 | Byrd | |
| 6,182,118 B1 | 1/2001 | Finney et al. | |
| 6,198,824 B1 | 3/2001 | Shambroom | |
| 6,292,668 B1 | 9/2001 | Alanara et al. | |
| 6,343,327 B2 | 1/2002 | Daniels et al. | |
| 6,356,905 B1 | 3/2002 | Gershman et al. | |
| 6,367,009 B1 | 4/2002 | Davis et al. | |
| 6,385,644 B1 | 5/2002 | Devine et al. | |
| 6,385,655 B1 * | 5/2002 | Smith | G06F 17/3089 707/E17.116 |
| 6,411,684 B1 | 6/2002 | Cohn et al. | |
| 6,442,600 B1 | 8/2002 | Anderson | |
| 6,442,686 B1 * | 8/2002 | McArdle | H04L 12/585 713/151 |
| 6,446,115 B2 | 9/2002 | Powers | |
| RE38,070 E | 4/2003 | Spies et al. | |
| 6,549,626 B1 | 4/2003 | Al-Saqan | |
| 6,571,334 B1 | 5/2003 | Feldbau et al. | |
| 6,584,564 B2 | 6/2003 | Olkin et al. | |
| 6,625,642 B1 | 9/2003 | Naylor et al. | |
| 6,643,684 B1 * | 11/2003 | Malkin | H04N 1/32037 379/905 |
| 6,651,166 B1 * | 11/2003 | Smith | G06F 21/606 380/277 |
| 6,690,773 B1 | 2/2004 | Law | |
| 6,697,944 B1 | 2/2004 | Jones et al. | |
| 6,721,784 B1 * | 4/2004 | Leonard | H04L 51/18 709/204 |
| 6,732,101 B1 | 5/2004 | Cook | |
| 6,760,752 B1 | 7/2004 | Liu et al. | |
| 6,769,016 B2 * | 7/2004 | Rothwell | H04L 12/585 706/20 |
| 6,865,191 B1 | 3/2005 | Bengtsson et al. | |
| 6,912,655 B1 | 6/2005 | Zucker | |
| 6,990,578 B1 | 1/2006 | O'Brien | |
| 7,051,003 B1 | 5/2006 | Kobata et al. | |
| 7,260,552 B2 | 8/2007 | Riera Jorba et al. | |
| 7,353,204 B2 | 4/2008 | Liu | |
| 7,475,256 B2 | 1/2009 | Cook | |
| 7,698,217 B1 | 4/2010 | Phillips et al. | |
| 8,972,717 B2 | 3/2015 | Cook et al. | |
| 2002/0029337 A1 | 3/2002 | Sudia et al. | |
| 2002/0059144 A1 * | 5/2002 | Meffert | G06F 21/10 705/51 |
| 2002/0091927 A1 | 7/2002 | Wall | |
| 2002/0178231 A1 | 11/2002 | Matsa et al. | |
| 2003/0105821 A1 * | 6/2003 | Shah | H04L 12/5855 709/206 |
| 2004/0006601 A1 | 1/2004 | Bernstein et al. | |
| 2004/0025057 A1 | 2/2004 | Cook | |
| 2004/0139314 A1 | 7/2004 | Cook et al. | |
| 2005/0257045 A1 | 11/2005 | Bushman et al. | |
| 2006/0095792 A1 | 5/2006 | Hurtado et al. | |
| 2006/0195540 A1 | 8/2006 | Hamilton et al. | |
| 2008/0071685 A1 | 3/2008 | Tayebi et al. | |
| 2009/0150675 A1 | 6/2009 | Cook | |
| 2010/0217979 A1 | 8/2010 | Yaghmour | |
| 2010/0275030 A1 | 10/2010 | Rooney | |

FOREIGN PATENT DOCUMENTS

| | | |
|---|---|---|
| EP | 0 907 120 | 4/1999 |
| EP | 1 104 964 | 12/1999 |
| EP | 1 145 508 | 10/2001 |
| EP | 1 311 984 | 5/2003 |
| GB | 2400284 | 6/2006 |
| JP | 2000-050331 | 2/2000 |
| WO | WO 97/49251 | 12/1997 |
| WO | WO 98/02989 | 1/1998 |
| WO | WO 98/58332 | 12/1998 |
| WO | WO 99/35784 | 7/1999 |
| WO | WO 99/42932 | 8/1999 |
| WO | WO 00/41533 | 7/2000 |
| WO | WO 01/97089 | 12/2001 |
| WO | WO 02/33872 | 4/2002 |

OTHER PUBLICATIONS

Canadian Office Action in Application No. 2,461,061, dated Dec. 23, 2013, 3 pages.
European, Communication pursuant to Article 96(2) EPC, European Application No. 01 944 575.8, dated Jul. 3, 2006, 5 pages.
European, Communication pursuant to Article 94(3) EPC, European Application No. 01 944 575.8, dated Jun. 14, 2010, 5 pages.
European, Communication pursuant to Article 94(3) EPC, European Application No. 01 944 575.8, dated Dec. 22, 2010, 7 pages.
European, European Search Report, European Application No. 10012628.3, dated Dec. 22, 2010, 8 pages.
European, European Search Report, European Application No. 10012629.1, dated Dec. 22, 2010, 10 pages.
European, Communication pursuant to Article 94(3) EPC, European Application No. 01 944 575.8, dated Oct. 17, 2011, 5 pages.
European, Communication pursuant to Article 94(3) EPC, European Application No. 10 012 628.3, dated Oct. 17, 2011, 4 pages.
European, Communication pursuant to Article 94(3) EPC, European Application No. 10 012 629.1, dated Oct. 17, 2011, 7 pages.
Brown et al., "A Proxy Approach to E-mail Security," Software Practice & Experience, Wily & Songs, Bognor Regis, GB, vol. 29, No. 12, Oct. 1, 1999, pp. 1049-1060.
Katagishi et al., "A Public Key Cryptography-based Security Enhanced Mail Gateway with the Mailing List Function," Communications Computer Signal Processing, 1999, IEEE Pacific Rim Conference on Victoria, BC, Canada, Aug. 22-24, 1999, pp. 262-265.
Price et al., "Security in Electronic Mail," Computer Communications, Elsevier Science Publishers BV, Amsterdam, NL, vol. 9, No. 2, Apr. 1, 1986, pp. 96-99.
"Infinite Technologies Introduces Secure WebMail: SSL Security Legitimizes Web-based E-mail for Corporate Use," Article from: PR Newswire, Sep. 9, 1998.
Taptich, "A Brief History of We Mail," Internet Citation, Nov. 1998, Retrieved from the Internet: URL:http://www.redherring.com/mag/issue60/mail.html [retrieved on May 30, 2003].

(56) References Cited

OTHER PUBLICATIONS

Bruce Schneier, Ed., "Applied Cryptography, Protocols, Algorithms, and Source Code in C," Jan. 1, 1996, John Wiley & Sons, Inc., New York, pp. 47-65, 566-572.
Paul Hoffman, Internet Mail Consortium, "SMTP Service Extension for Secure SMTP over TLS; draft-hoffman-smtp-ssl-09.txt," IETF Standard-Working-Draft, Internet Engineering Task Force, IETF, CH, No. Oct. 25, 1998, 5 pages.
Ari Luotonen, Netscape Communication Corporation "Tunneling SSL Through WW Proxy; draft-luotonen-ssl-tunneling-02.txt," IETF Standard-Working-Draft, Internet Engineering Task Force, IETF, CH, No. 2, Dec. 14, 1995, 5 pages.
Machine Translation (claims only) of Japanese Patent Publication No. 2000-050331 (published Feb. 2000), 2 pages.
Authorized officer Uyen T. Le, International Search Report or the Declaration in PCT/US01/19336, mailed Oct. 18, 2001, 4 pages.
Authorized officer Uyen T. Le, Written Opinion in PCT/US01/19336, mailed May 8, 2002, 4 pages.
Authorized officer Uyen T. Le, International Preliminary Examination Report in PCT/US01/19336, mailed Jan. 2, 2003, 5 pages.
Serenelli et al., "Securing Electronic Mail Systems," Military Communication Conference, Oct. 11-14, 1992, MILCOM '92, Conference Record Communication—Fusing Command, Control, and Intelligence, New York, NY, pp. 677-680.
UK Abbreviated Examination Report from UK Application No. GB0406186.7, mailed Aug. 12, 2005, 1 page.
UK Abbreviated Examination Report from UK Application No. GB0406186.7, mailed Dec. 21, 2005, 1 page.
UK Search Report from UK Application No. GB0406186.7, mailed Jul. 28, 2004, 6 pages.
Office Action in CA 2,461,061, mailed Feb. 25, 2013, 3 pages.
U.S. Appl. No. 60/200,378, filed Apr. 28, 2000.

* cited by examiner

AUTOMATIC DELIVERY SELECTION FOR ELECTRONIC CONTENT

CROSS-REFERENCE TO RELATED APPLICATIONS

This application is a continuation application of U.S. application Ser. No. 10/397,064, filed on Mar. 24, 2003 (now U.S. Pat. No. 8,972,717), which is a continuation-in-part of U.S. application Ser. No. 09/595,416, filed on Jun. 15, 2000 (now U.S. Pat. No. 6,732,101). The disclosures of the prior applications are considered part of and are incorporated by reference in the disclosure of this application.

FIELD OF THE INVENTION

The present application relates to electronic communication.

BACKGROUND

Many email users recognize the importance of security in their communications and most want solutions to secure their email communications. A conventional solution for solving the email security problem includes a system using public and private key pairs for both the sender and the recipient. However, while conventional solutions address the pure communication security issues, other problems have arisen, mostly due to use of the commonly available public network, the Internet. Problem areas include unwanted, unauthorized, or inappropriate communications.

Since most emails traverse the Internet and virtually all email addresses can eventually become known, conventional email communication systems have problems with spam/junk mail or embedded viruses. Additionally, conventional email communication systems do not provide for controls for the unauthorized use of email communications for the transfer of protected intellectual property, such as copyrighted music files, corporate secrets, or sensitive information (e.g., social security numbers, credit card numbers, passwords, etc.). Also, conventional email communication systems do not filter email communications for inappropriate content, such as, in a corporate setting, communications that include offensive language, suggestive pictures, threats, and other blatant or illegal content.

In addition to these problem areas, it may be important for a sender to have confirmation that an email message has been received by the intended recipient and at what time the message was opened. Many conventional email systems do not provide such services.

Clearly, not everyone wants or needs the same solution. For example, an individual sending a simple note to a friend at a corporate email address may not see a need for any sort of security, virus scanning or content filtering, whereas the corporation that will be receiving the email message may see a significant need to address these issues. Some email users are willing to, and are competent to, install a secure email client on their desktop computers and generate a pair of public and private keys in order to send and receive encrypted communications at the desktop. However, many of their potential email correspondents may not be willing, not allowed or may not be competent to install and operate that type of email encryption system. Some organizations do not want users to install a desktop secure email client. In fact, some organizations do not want encrypted communications to reach the desktop computers at all. These organizations would prefer encrypted communications to be decrypted at a gateway, so that the content of the communications can be easily scanned, filtered and/or monitored. Still there are others who do not want to install a secure desktop client nor a gateway solution, but are willing to send and/or receive secure emails through a third party hosted message center using a secure communication link, such as SSL.

It is important to note that secure email communications require the sender and the recipient to use the same acceptable level of security. Security that is acceptable to the recipient may not be acceptable to the sender, or vice-versa. Different delivery methods are associated with different security levels. For example, encrypting a message using the public key of the recipient and sending the encrypted message directly to the recipient's desktop is perhaps the most secure solution, because no one else, including network administrators, can read the encrypted message. An alternative method includes encryption/decryption at a gateway of an organization's network where certain scanning or filtering functions can be performed. In this scenario, the encrypted message cannot be read by anyone outside of the organization. However, once the message is decrypted at the gateway, it becomes accessible to people who have access to the email server or internal network traffic (e.g., network administrators). Details of the use of the recipient's private key or a corporation master private key will be obvious to the skilled reader. Another secure method is to use a third party hosted message center to receive a message (securely or not), and then allow the recipient to access the message by use of a password through a secure communications link such as SSL. This method has the benefit that no public/private key pairs are needed and no special software needs to be installed by the recipient, either on the desktop or at the gateway. A further benefit of the third party hosting method is the ability to provide affirmation of receipt of a message by the intended recipient, including the date and time, to the original sender. However when using third party hosted systems, one down side is that the third party itself may have access to the messages stored on their message center systems and could be forced, under certain conditions, to provide certain information under an authorized court order regarding a particular message, even if the message content has been destroyed or is stored in an encrypted manner.

SUMMARY OF THE INVENTION

A system and method for automatically choosing a best method for delivery of email communications is provided. In one aspect the invention provides a method for the secure delivery of a message in a communication system and includes identifying a best method for delivery of a message including considering preferences of a sender and a recipient and sending the message from the sender to the recipient using the identified method.

Aspects of the invention can include one or more of the following features. The step of identifying can include selecting from direct delivery, gateway delivery, and message center delivery methods. The method can include identifying a preferred ordering of delivery methods from among the delivery methods and attempting to deliver the message to the recipient in accordance with the ordering. Direct delivery can include encrypting the message using public key encryption and retrieving a public key for the recipient to encrypt the message. Gateway delivery can include encrypting the message using public key encryption, encrypting the message using the public key of a recipient gateway that is coupled between the sender and the recipient, delivering the message encrypted to a recipient's gateway, and decrypting the message at the recipient's gateway prior to sending the message to the recipient.

The method can include scanning the decrypted message at the recipient's gateway for inappropriate, unwanted or unauthorized content. The method can include dropping or logging the message if the scanning step detects inappropriate, unwanted or unauthorized content.

The gateway delivery method can include directing the message from the sender to a sending gateway; scanning the message for inappropriate, unwanted or unauthorized content; and processing the message if the scanning step detects inappropriate, unwanted or unauthorized content.

The step of identifying a best method for delivery of a message can include considering content of the message.

In another aspect, the invention provides a method for the secure delivery of a message in a communication system and includes identifying a best method from among a plurality of delivery methods for delivery of a message including considering preferences of a sender and a recipient and sending the message from the sender to the recipient using the identified method. If the sending step fails, the method includes determining an order from among the remaining plurality of delivery methods for attempting additional delivery attempts and sending the message in accordance with the determined delivery order until the message is delivered or all delivery methods have been attempted.

In another aspect, the invention provides a method for the secure delivery of a message in a communication system and includes determining an order from among a plurality of electronic delivery methods for delivery of the message from a sender to the recipient and sending the message in accordance with the determined delivery order until the message is delivered or all delivery methods have been attempted.

Aspects of the invention can include one or more of the following features. The order can be set using preferences of the sender and the recipient. The order can be set based at least in part on the contents of the message. The order can be set dynamically at the time for sending or be preset. The order can be set by a corporate entity associated with the sender or the recipient. The order can be pre-selected as direct, gateway, then message center methods. Alternatively, the order can be pre-selected as gateway, direct and message center methods. The step of setting the order can include determining if the recipient or a recipient gateway has a public key that is accessible to the communication system, and if not, using a message center delivery method as the only delivery method.

In another aspect, the invention provides a method for the secure delivery of a message in a communication system from a sender to a recipient connected to the communication system. The method includes, at the sender, determining if an encryption client is available to encrypt a message, and if so, then, locating a public key for the recipient or a recipient gateway. If none are found, then the method includes delivering the message to a message center for delivery to the recipient. If a public key is located, then the method includes encrypting the message and sending the message to the recipient either directly or through the recipient gateway.

Aspects of the invention can include one or more of the following features. The message can include content for pay, and the method can further include, at the time for pick-up of the message at the message center, requiring the recipient to provide evidence of payment prior to delivering the message to the recipient.

In another aspect, the invention provides a method for the secure delivery of a message in a communication system from a sender to a recipient connected to the communication system. The method includes, at the sender, composing a message and sending the message to the recipient. The method includes intercepting the message at a gateway between the sender and the recipient and locating a public key for the recipient or a recipient gateway. If none are found, then the method includes delivering the message to a message center for delivery to the recipient. If a public key is located, then the method includes encrypting the message at the gateway and sending the message to the recipient either directly or through the recipient gateway.

Aspects of the invention can include one or more of the following features. The method can include scanning the message for inappropriate, unwanted or unauthorized content at the gateway and processing the message if the scanning step detects inappropriate, unwanted or unauthorized content.

In another aspect, the invention provides a method for the secure delivery of a message in a communication system from a sender to a recipient connected to the communication system where the communication system includes a message center and the sender is connected to the message sender. The method includes, at the sender, composing a message and sending the message to the message center and locating a public key for the recipient or a recipient gateway. If none are found, the method includes storing the message in a message store and communicating with the recipient to indicate a message is available for pick-up at the message center. If a public key is located, the method includes encrypting the message at the message center and sending the message to the recipient either directly or through the recipient gateway.

In another aspect, the invention provides a method for the secure delivery of a message in a communication system from a sender to a recipient connected to the communication system. The method includes, at the sender, determining if an encryption client is available to encrypt a message, and if so, then, locating a public key for a recipient gateway where the recipient gateway is located between the sender and the recipient in the communication system. If no key is found, the method includes delivering the message to a message center for delivery to the recipient. If a public key is located, the method includes encrypting the message and sending the message to the recipient through the recipient gateway. The method includes, at the recipient gateway, decrypting the message and scanning the message for inappropriate, unwanted or unauthorized content prior to delivery to the recipient.

In another aspect, the invention includes computer program products for causing a computer to execute instructions to perform the method steps described above.

A system, method and computer program product for email communications are provided that takes care of the differing sender and recipient preferences including differing security levels and then automatically chooses a best method of delivery that will be acceptable to both the sender and the recipient. Aspects of the invention may include one or more of the following advantages.

The system takes into account, for both senders and recipients, the different requirements and preferences of the users (e.g., individuals and small and large corporations), and offers every user a preferred best solution while maintaining interoperability. For senders and recipients who are willing to install desktop clients and generate public/private key pairs, the system offers end-to-end encryption and the highest possible security. For users (e.g., corporations) who do not want encryption/decryption software on a respective user's (e.g., employee's) desktop or for entities that want to scan, filter or monitor email traffic at a gateway, the invention provides a gateway encryption/decryption solution to satisfy such needs. The invention allows encrypted messages to be sent from anyone to anyone. The invention allows senders to use a Web browser-accessible message center as a secure sending mechanism or as a secure delivery mechanism. The recipient is able to pick up the message using a web browser over SSL (https:). A single password establishment procedure is required upon the receipt of a first message by any given recipient. All future messages to that same recipient, regardless of the sender's identity may be picked up using the same password.

The invention provides certain interoperability between the advantages described above. For example, an individual may install a desktop email encryption system with a public/private key pair. The individual may then send a secure message to recipients who will be using a desktop solution, a gateway solution, or the message center solution.

For senders that require affirmation of message receipt, the invention provides various options. For example, a healthcare company that sends the results of an important laboratory test to a patient may choose to use the message center approach and request a date & time stamped receipt indicating that the patient indeed did see the laboratory results. Failure to receive the receipt might prompt the healthcare company to phone or otherwise contact the individual patient.

These and other advantages of the present invention will become apparent from the following description and from the claims.

DETAILED DESCRIPTION

Figure 1:
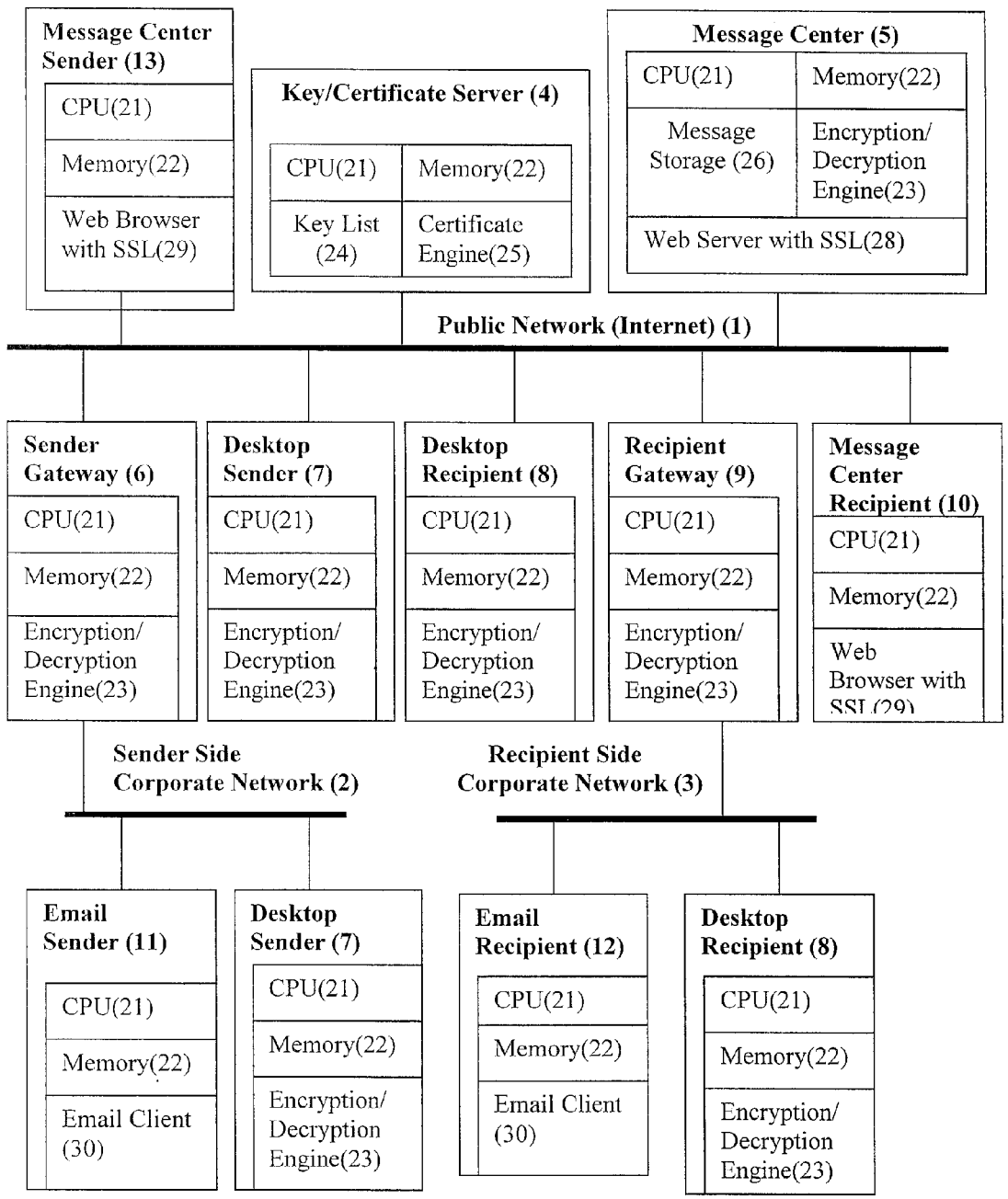
FIG. 1 shows a communication system for automatic content delivery.

Referring now to FIG. 1, a communication system 100 includes a Public Network (1), such as the Internet, and a Sending Side Corporate Network (2) that is isolated and (or otherwise) connected to the Public Network (1) (e.g., through a firewall). In one implementation, Sending Side Corporate Network (2) can be an individual linked to the Public Network (1) through an Internet Service Provider (ISP).

In the implementation shown, the Sending Side Corporate Network (2) is coupled to the Public Network (1) via a Sender Gateway (6). Sender Gateway (6) may include a firewall (not shown). Sender Gateway (6) can be a general purpose or specialized computer that includes a CPU (21) and Memory (22) as well as an Encryption/Decryption engine (23). The Sender Gateway (6) can be responsible for encrypting messages received from an Email Sender (11) inside the Sender Side Corporate Network (2) and then sending the messages to appropriate places according to a best method of delivery that is described in more detail below. The Sender Gateway (6) may have an assigned public key hosted in the Key/Certificate Server (4) and have access to the corresponding private key(s) for the purpose of decrypting certain incoming messages that have symmetric decryption keys encrypted by the public key and for the purpose, if desired, of digitally signing certain outgoing messages sent via the Gateway.

Communication system 100 also includes a Receiving Side Corporate Network (3), that is isolated and (or otherwise) connected to the Public Network (1) (e.g., through a firewall. In one implementation, Receiving Side Corporate Network (2) can be an individual linked to the Public Network (1) through an Internet Service Provider (ISP).

In the implementation shown, the Receiving Side Corporate Network (3) is coupled to the Public Network (1) via a Recipient Gateway (9). Recipient Gateway (9) may include a firewall (not shown). Recipient Gateway (9) can be a general purpose or specialized computer that includes a CPU (21), Memory (22) and an Encryption/Decryption engine (23). Recipient Gateway (9) can be responsible for decrypting messages received from the Public Network (1) and then forwarding the decrypted messages to an Email Recipient (12) on Recipient Side Corporate Network (3). Recipient Gateway (9) requires a public key hosted on Key/Certificate Server (4) and has access to the corresponding private decryption key. The operation of Recipient Gateway (9) is described in greater detail below.

Communication system 100 also includes a Key/Certificate Server (4) connected to the Public Network (1). The Key/Certificate Server (4) is a general purpose or specialized computer that includes a CPU (21) and Memory (22). Key/Certificate Server (4) maintains a list of public keys each associated with an email address (Key List (24)). The public keys can be retrieved from Key/Certificate Server (4) through the Public Network (1). Optionally, digital certificates that certify user public keys can also be retrieved. These certificates can be static certificates (such as X.509 certificates), or "Transaction Certificates" issued in real time to certify the sender's public key, the recipient's public key, the hash of a message being sent, and the time of the message simultaneously. Descriptions of Key/Certificate Servers can be found in co-pending and commonly assigned patent entitled "CERTIFIED TRANSMISSION SYSTEM," assigned U.S. Pat. No. 7,353,204, and incorporated herein by reference. Key/Certificate Server (4) also includes a Certificate Engine (25) that is used to retrieve the static certificates or to issue transaction certificates in real time. A skilled reader will recognize that Key/Certificate Server (4) may actually be a series of different servers located throughout the world and connected to Public Network (1), some of which contain the same keys, some of which contain unique keys. Additionally, references to public and private keys should, to a skilled reader, imply usage, sometimes with different key pairs, of both encryption/decryption functions and digital signing/signature verification functions.

Communication system 100 also includes a Message Center (5) connected to the Public Network (1). The Message Center (5) is used to store messages sent to recipients, when, for example, neither the recipient nor the recipient's gateway has a public key on Key/Certificate Server (4). Message Center (5) can be a general purpose or specialized computer. In addition to the common elements of a computer (CPU 21 and Memory 22), Message Center (5) includes Message Storage (26), such as a database to store the messages, and an Encryption/Decryption Engine (23) to encrypt outgoing messages and decrypt received messages.

Finally, Message Center (5) includes a Web server (28) that supports SSL or other encryption formats to allow the recipient to make SSL connections in order to view the messages using a Web browser securely. A skilled reader will recognize that Message Center (5) should use good internal encryption methods when storing messages in order to prevent hackers, internal employees or other non-authorized individuals from viewing the stored messages.

Communication system 100 also includes various users, including a Desktop Sender (7), Desktop Recipient (8), Email Sender (11), Email Recipient (12), Message Center Sender (13) and Message Center Recipient (10). Each of these users is discussed in greater detail below.

A Desktop Sender (7) can be connected to the Public Network (1). The Desktop Sender (7) can be a computer that includes an Encryption/Decryption Engine (23). The Encryption/Decryption Engine (23) is used to encrypt outgoing messages. A Desktop Sender (7) can also be connected to the Sending Side Corporate Network (2) behind the Sender Gateway (6). In such a case, the Sender Gateway (6) can be configured to automatically recognize that messages from the Desktop Sender (7) are already encrypted and will simply pass the messages through without adding another layer of encryption. In one implementation, Gateway (6) may have access via its own private key to the symmetric key that Desktop Sender (7) used to encrypt the outgoing message. This allows Gateway (6) to scan and/or filter the content before passing the message along without adding an additional layer of encryption or adding a digital signature. The Desktop Sender (7) may have a public key hosted in the Key/Certificate Server (4) and have access to the corresponding private key, if digitally signing the message is desired.

A Desktop Recipient (8) can be connected to the public network (1). The Desktop Recipient (8) can be a computer that includes Encryption/Decryption Engine (23). The Encryption/Decryption Engine (23) is used to decrypt incoming messages. A Desktop Recipient (8) can also be connected to the Receiving Side Corporate Network (3) behind the Recipient Gateway (9). In such a case, the Recipient Gateway (9) can be automatically configured to recognize that messages for the Desktop Recipient (8) are encrypted and will simply pass the messages through without decryption. Desktop Recipient (8) requires a public key hosted on Key/Certificate Server (4) and has access to the corresponding private key.

A Message Center Recipient (10) can be connected to the Public Network (1). The Message Center Recipient (10) can be a computer that does not have an Encryption/Decryption Engine installed. Instead, Message Center Recipient (10) accesses messages stored in Message Center (5) using, for example, Web browser (29) over a secure link, such as SSL.

An Email Sender (11) can be connected to the Sender Side Corporate Network (2). Email Sender (11) can be a conventional computer that has a conventional email client to send non-encrypted email messages. The Sender Side Corporate Network (2) can be configured in such a way that the email messages sent out by Email Sender (11) will be automatically routed to the Sender Gateway (6). The Sender Gateway (6) will then deliver the message using a best method of delivery that is described in detail below.

An Email Recipient (12) can be connected to the Recipient Side Corporate Network (3). Email Recipient (12) can be a conventional computer that has a conventional email client to receive non-encrypted email messages.

A Message Center Sender (13) can be connected to the Public Network (1). The Message Center Sender (13) is identical to Message Center Recipient (10), except it is used to send messages through the Message Center (5) using the Web browser (29) over a secure link, such as SSL.

Operation

Figure 2:
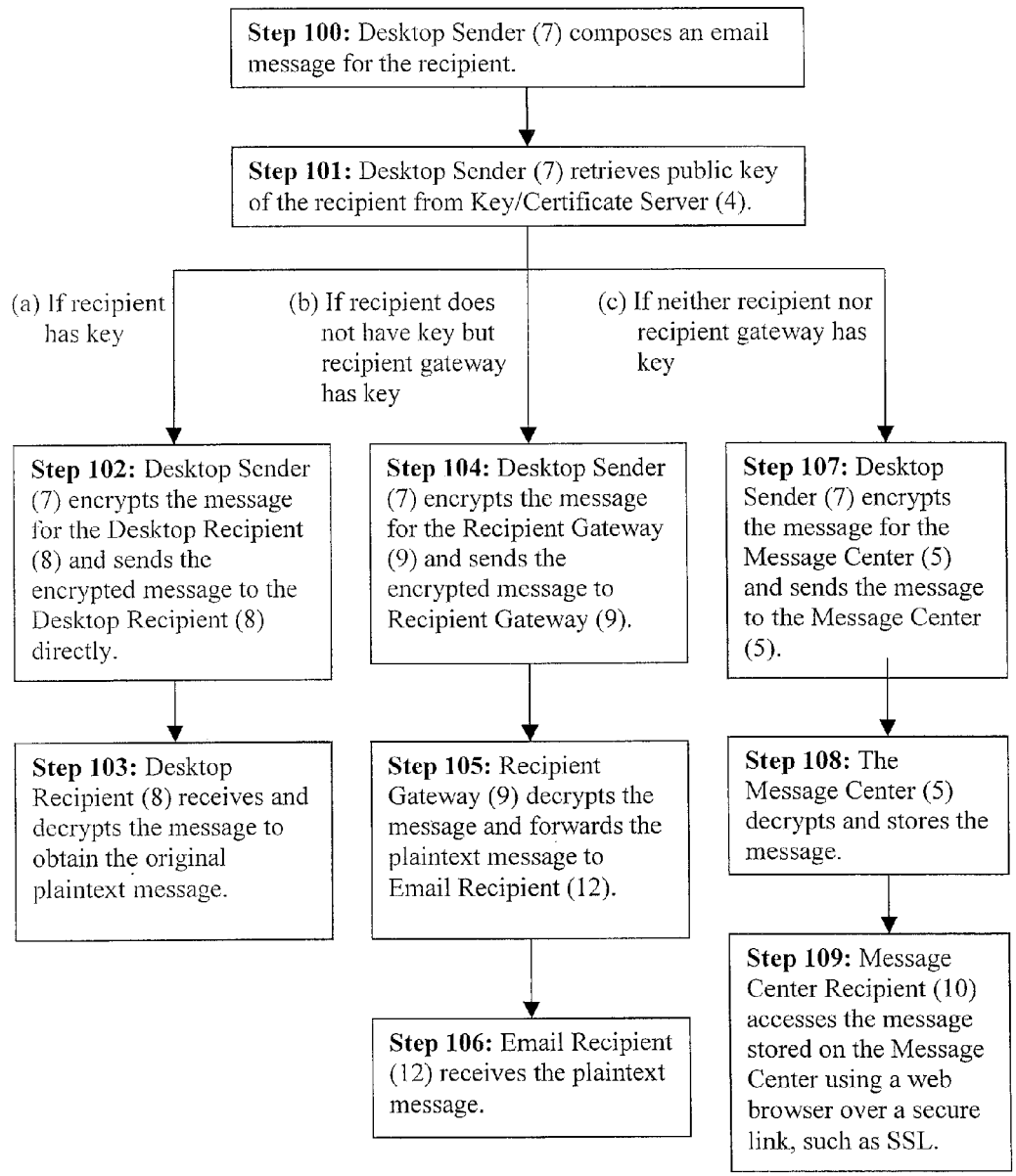
FIG. 2 shows a method for secure delivery of content by a sender with desktop encryption software.

Communication system 100 works slightly differently depending whether the message is originated from a Desktop Sender (7), from an Email Sender (11), or from a Message Center Sender (13). FIG. 2 shows a method for delivery including encryption processes when a message is originated from the Desktop Sender (7). Referring now to FIGS. 1 and 2, the detailed steps are discussed below.

At step 100, the Desktop Sender (7) composes an email message for the recipient. The Desktop Sender (7) can use a conventional email client to compose the message and then use the Encryption/Decryption Engine (23) to encrypt the message, or can use a special standalone client that is combined with the Encryption/Decryption Engine (23) to compose and encrypt the message. At step 101, the Desktop Sender (7) tries to retrieve the public key of the recipient from the Key/Certificate Server (4). This may produce 3 different results: a) the recipient's (e.g., the Desktop Recipient's (8)) public key is found; b) the recipient's (e.g., the Email Recipient's (12)) public key is not found, indicating that the recipient cannot receive encrypted messages directly, but the Recipient's Gateway (9) public key is found; and, c) neither the recipient's public key nor the Recipient's Gateway (9) public key is found, thus indicating that the recipient cannot directly receive encrypted messages and is not securely reachable through a gateway.

If the Desktop Recipient's public key is found (case a), the Desktop Sender (7) will receive the public key of Desktop Recipient (8). Optionally, Desktop Sender (7) may receive a certificate to certify that the Desktop Recipient's (8) public key is authentic. In one implementation, the certificate is a transaction certificate that certifies the public keys of Desktop Sender (7) and Desktop Recipient (8), the hash of the message, as well as the time of the message. In another implementation, depending upon the requirements of Desktop Recipient's (8) corporate policies, the symmetric key used to encrypt the message can separately be encrypted by Recipient's Gateway (9) public key and included within the message package that is sent to the Desktop Recipient (8), thus allowing the Desktop Recipient's (8) corporation to open and read the encrypted message should, for example, a court order be issued requiring same.

If the Email Recipient's (12) public key is not found, indicating that the Email Recipient (12) cannot receive encrypted messages directly, a check is made to locate the Recipient's Gateway (9) public key. If the public key of the Recipient's Gateway (9) is found, the Email Recipient (12) is able to receive the encrypted message through the Recipient Gateway (9) (case b). In this case, the Desktop Sender (7) will retrieve the public key of the Recipient Gateway (9). Optionally the Desktop Sender (7) may receive a certificate to certify that the public key of Recipient Gateway (9) is authentic. In one implementation, the certificate is a transaction certificate that certifies the public keys of Desktop Sender (7) and Recipient Gateway (9), the hash of the message, as well as the time of the message.

If neither the Email Recipient's (12) public key or the Recipient Gateway's (9) public key is found, the recipient cannot directly receive encrypted messages and is not securely reachable through a gateway (case c). In this case, the message is automatically delivered through the Message Center (5).

At step 102, (This step is carried out when the public key of the Desktop Recipient (8) is found (case (a) in step 101), the Desktop Sender (7) encrypts the message for the recipient using Encryption/Decryption Engine (23). More specifically, the public key of the recipient is used to encrypt a randomly generated symmetric key, and the symmetric key is used to encrypt the message. An example of public key encryption is RSA. Examples of symmetric key encryption are AES and Triple-DES. Optionally, a transaction certificate may be attached to the message. The message may also be digitally signed. The encrypted message is then directly sent, using conventional means, via Public Network (1) to the Desktop Recipient (8). When the Desktop Recipient (8) receives the encrypted message at step 103, the Desktop Recipient (8) decrypts the message using the Encryption/Decryption Engine (23). More specifically, the recipient's private key is used to recover the symmetric key encrypted by the public key, and then the symmetric key is used to decrypt the message. Optionally, the Desktop Recipient (8) may verify the digital signature of the sender and verify the transaction certificate that may be attached to the message. In one implementation, a certified receipt may be returned to the Desktop Sender (7) or Sender Gateway (6) using methods described in the "CERTIFIED TRANSMISSION SYSTEM." This completes the delivery process for case (a).

When the Email Recipient's (12) public key is not found but the Recipient's Gateway (9) public key is found on the Key/Certificate Server (4) (case (b) in step 101), the Desktop Sender (7) encrypts the message for the Recipient Gateway (9) at step 104. More specifically, the public key of the Recipient Gateway (9) is used to encrypt a randomly generated symmetric key, and the symmetric key is used to encrypt the message. Optionally, a transaction certificate may be attached to the message. The message may also be digitally signed. The encrypted message is then sent, using conventional means, via the Public Network (1) to the Recipient Gateway (9).

When the Recipient Gateway (9) receives the encrypted message, the Recipient Gateway (9) decrypts the message using the Encryption/Decryption Engine (23) at step 105. More specifically, the private key of the Recipient Gateway (9) is used to recover the symmetric key encrypted by the public key, and then the symmetric key is used to decrypt the message. Optionally, the Recipient Gateway (9) may verify the digital signature of the sender and verify the transaction certificate that may be attached to the message. After the Recipient Gateway (9) has decrypted the message, the non-encrypted message can be forwarded along to the Email Recipient (12). It is possible that a message received by the Recipient Gateway (9) is not encrypted for the Recipient Gateway (9), but is encrypted for a Desktop Recipient (8) on Corporate Network (3) behind the Recipient Gateway (9). If the Recipient Gateway (9) recognizes such a case, the gateway can simply pass the encrypted message through to the Desktop Recipient (8) without trying to decrypt the message. In the event that a second copy of the message's symmetric encryption key is available to Gateway (9) by use of Gateway (9)'s private key, one skilled in the art will easily see that the Recipient Gateway (9), can decrypt the incoming message and have the ability to scan for viruses, filter out offensive material, and perform other functions before ultimately forwarding the message to the final recipient, even if the forwarded message is in the original encrypted form. In one implementation, a "certified receipt" may be returned to the Desktop Sender (7) or Sender Gateway (6) in accordance with the methods described in the "CERTIFIED TRANSMISSION SYSTEM." At step 106, the Email Recipient (11) receives the non-encrypted message. This finishes the delivery process for case (b).

When neither the Email Recipient (12) nor the Recipient's Gateway (9) has a key on Key/Certificate Server (4) (case (c) in step 101), the Desktop Sender (7) encrypts the message for the Message Center (5) using Encryption/Decryption Engine (23) at step 107. More specifically, the public key of the Message Center (5) is used to encrypt a randomly generated symmetric key, and the symmetric key is used to encrypt the message. Optionally, a transaction certificate may be attached to the message. The message may also be digitally signed. The encrypted message is then sent, using conventional means via Public Network (1) to the Message Center (5). The sending of the message may be accomplished by a standard email protocol such as SMTP or may be accomplished using an alternate secure protocol, such as HTTPS.

When the Message Center (5) receives the encrypted message, Message Center (5) decrypts the message using the Encryption/Decryption Engine (23) at step 108. More specifically, the private key of the Message Center (5) is used to recover the symmetric key encrypted by the public key, and then the symmetric key is used to decrypt the message. Optionally, the Message Center (5) may verify the digital signature of the sender and the transaction certificate that may be attached to the message. After the Message Center (5) has decrypted the message, the Message Center (5) stores the message in the Message Storage (26). The stored messages may again be encrypted to prevent unauthorized access. Each stored message may have an expiration time after which the message will be purged from the Message Storage (26) to save storage space or to permanently erase the outdated messages. In one implementation, a notification email may be sent to the final recipient (Message Center Recipient (10)) to let him/her know that a message is at the Message Center (5) waiting to be picked up.

When the Message Center Recipient (10) picks up the message stored at the Message Center (5), the Web Browser (29) is launched and connected to the Message Center (10) via, for example, SSL at step 109. The Message Center (5) then converts the message into an appropriate format (e.g., HTML format) and sends the formatted message to the Web Browser (29). The Web Browser (29) then displays the message to the recipient. This finishes the delivery for case (c). In one implementation, the access to the messages sent to a particular Message Center Recipient (10) is controlled by a password account. If the Message Center Recipient (10) does not have a password account yet, a signup procedure can be initiated to establish such an account when the Message Center Recipient (10) accesses the Message Center (5) for the first time. In one implementation, a receipt is sent back to the original sender that shows the date and time that the message was opened by Message Center Recipient (10). Alternatively, the Message Center (5) may deliver the message to the intended recipient through other means, including direct communication. For example, although the Message Center Recipient (10) does not have a public key in Key/Certificate Server (4), he may have a different type of public key in another PKI system. In such a case, the Message Center (5) may be connected to that PKI system to retrieve the recipient's public key or the recipient's gateway public key. In this scenario, the Message Center (5) can forward the message to the recipient directly (encrypted with the recipient's public key).

Figure 3:
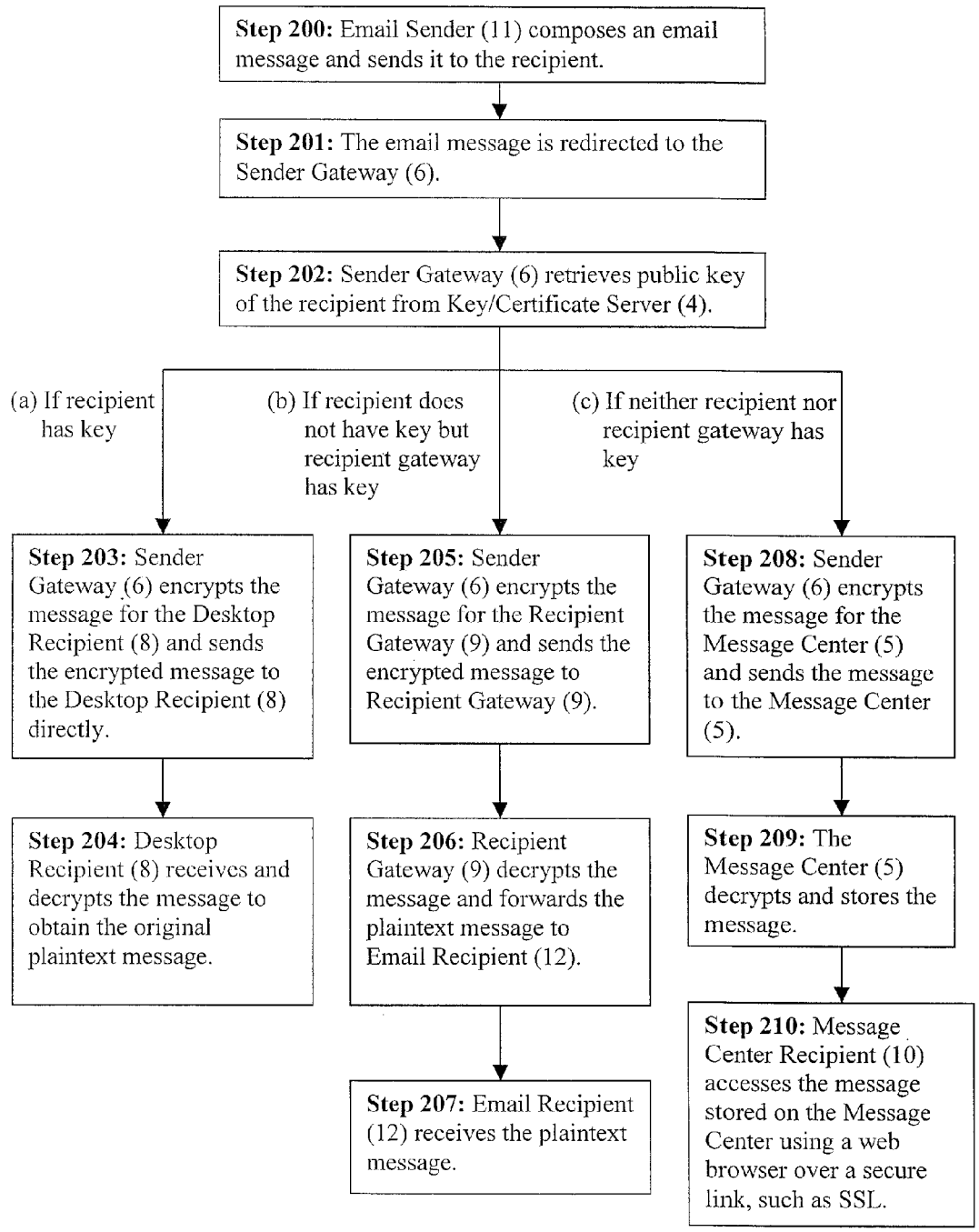
FIG. 3 shows a method for secure delivery of content by a sender who does not have encryption software on the desktop, but can send through a gateway that has encryption capabilities.

Referring now to FIGS. 1 and 3, a method is described for the delivery process when a message is originated from an Email Sender (11). At step 200, the Email Sender (11) composes an email message and sends it to a recipient using a conventional email client (30). At step 201, the email message is directed (or redirected as required) to the Sender Gateway (6). This can be achieved by simply configuring the outgoing SMTP path of the mail server to point to the Sender Gateway (6). At step 202, Sender Gateway (6) performs steps essentially identical to steps 101-109 of FIG. 2 to locate the public key of the recipient or the recipient's gateway. These steps are essentially the same, except they are carried out by the Sender Gateway (6) instead of the Desktop Sender (7).

More specifically, at step 202, the Sender Gateway (6) tries to retrieve the public key of the recipient from the Key/Certificate Server (4). This may produce 3 different results: a) the recipient's (e.g., the Desktop Recipient's (8)) public key is found; b) the recipient's (e.g., the Email Recipient's (12)) public key is not found, indicating that the recipient cannot receive encrypted messages directly, but the Recipient's Gateway (9) public key is found; and, c) neither the recipient's public key nor the Recipient's Gateway (9) public key is found, thus indicating that the recipient cannot directly receive encrypted messages and is not securely reachable through a gateway.

If the Desktop Recipient's public key is found (case a), the Sender Gateway (6) will retrieve the public key of Desktop Recipient (8). Optionally, Sender Gateway (6) may retrieve a certificate to certify that the Desktop Recipient's (8) public key is authentic. In one implementation, the certificate is a transaction certificate that certifies the public keys of Sender Gateway (6) and Desktop Recipient (8), the hash of the message, as well as the time of the message. In another implementation, depending upon the requirements of Desktop Recipient's (8) corporate policies, the symmetric key used to encrypt the message can separately be encrypted by Recipient's Gateway (9) public key and included within the message package that is sent to the Desktop Recipient (8), thus allowing the Desktop Recipient's (8) corporation to open and read the encrypted message should, for example, a court order be issued requiring same.

If the Email Recipient's (12) public key is not found, indicating that the Email Recipient (12) cannot receive encrypted messages directly, a check is made to locate the Recipient's Gateway (9) public key. If the public key of the Recipient's Gateway (9) is found, the Email Recipient (12) is able to receive the encrypted message through the Recipient Gateway (9) (case b). In this case, the Sender Gateway (6) will retrieve the public key of the Recipient Gateway (9). Optionally the Sender Gateway (6) may receive a certificate to certify that the public key of Recipient Gateway (9) is authentic. In one implementation, the certificate is a transaction certificate that certifies the public keys of Sender Gateway (6) and Recipient Gateway (9), the hash of the message, as well as the time of the message.

If neither the Email Recipient's (12) public key or the Recipient Gateway's (9) public key is found, the recipient cannot directly receive encrypted messages and is not securely reachable through a gateway. In this case, the message is automatically delivered through the Message Center (5).

At step 203, (this step is carried out when the public key of the Desktop Recipient (8) is found (case (a) in step 202), the Sender Gateway (6) encrypts the message for the recipient using Encryption/Decryption Engine (23). More specifically, the public key of the recipient is used to encrypt a randomly generated symmetric key, and the symmetric key is used to encrypt the message. An example of public key encryption is RSA. An example of the symmetric key encryption is Triple-DES. Optionally, a transaction certificate may be attached to the message. The message may also be digitally signed. The encrypted message is then directly sent, using conventional means, via Public Network (1) to the Desktop Recipient (8). When the Desktop Recipient (8) receives the encrypted message at step 204, the Desktop Recipient (8) decrypts the message using the Encryption/Decryption Engine (23). More specifically, the recipient's private key is used to recover the symmetric key encrypted by the public key, and then the symmetric key is used to decrypt the message. Optionally, the Desktop Recipient (8) may verify the digital signature of the Sender Gateway (6) and verify the transaction certificate that may be attached to the message. In one implementation, a certified receipt may be returned to the Sender Gateway (6) using methods described in the "CERTIFIED TRANSMISSION SYSTEM" It is possible that the message received by Sender Gateway (6) is not a plaintext message from Email Sender (11) but an encrypted message from a Desktop Sender (7) on the Sender Side Corporate Network (2). If Sender Gateway (6) recognizes such a case, Sender Gateway (6) can be configured to simply pass the encrypted message through without adding another layer of encryption. This completes the delivery process for case (a).

When the Email Recipient's (12) public key is not found but the Recipient's Gateway (9) public key is found on the Key/Certificate Server (4) (case (b) in step 202), the Sender Gateway (6) encrypts the message for the Recipient Gateway (9) at step 205. More specifically, the public key of the Recipient Gateway (9) is used to encrypt a randomly generated symmetric key, and the symmetric key is used to encrypt the message. Optionally, a transaction certificate may be attached to the message. The message may also be digitally signed. The encrypted message is then sent, using conventional means, via the Public Network (1) to the Recipient Gateway (9).

When the Recipient Gateway (9) receives the encrypted message, the Recipient Gateway (9) decrypts the message using the Encryption/Decryption Engine (23) at step 206. More specifically, the private key of the Recipient Gateway (9) is used to recover the symmetric key encrypted by the public key, and then the symmetric key is used to decrypt the message. Optionally, the Recipient Gateway (9) may verify the digital signature of the Sender Gateway (6) and verify the transaction certificate that may be attached to the message. After the Recipient Gateway (9) has decrypted the message, the non-encrypted message can be forwarded along to the Email Recipient (12). It is possible that a message received by the Recipient Gateway (9) is not encrypted for the Recipient Gateway (9), but is encrypted for a Desktop Recipient (8) on Corporate Network (3) behind the Recipient Gateway (9). If the Recipient Gateway (9) recognizes such a case, the gateway can simply pass the encrypted message through to the Desktop Recipient (8) without trying to decrypt the message. In the event that a second copy of the message's symmetric encryption key is available to Gateway (9) by use of Gateway (9)'s private key, one skilled in the art will easily see that the Recipient Gateway (9), can decrypt the incoming message and have the ability to scan for viruses, filter out offensive material, and perform other functions before ultimately forwarding the message to the final recipient, even if the forwarded message is in the original encrypted form. In one implementation, a "certified receipt" may be returned to the Sender Gateway (6) in accordance with the methods described in the "CERTIFIED TRANSMISSION SYSTEM." At step 207, the Email Recipient (11) receives the non-encrypted message. This finishes the delivery process for case (b).

When neither the Email Recipient (12) nor the Recipient's Gateway (9) has a key on Key/Certificate Server (4) (case (c) in step 202), the Sender Gateway (6) encrypts the message for the Message Center (5) using Encryption/Decryption Engine (23) at step 208. More specifically, the public key of the Message Center (5) is used to encrypt a randomly generated symmetric key, and the symmetric key is used to encrypt the message. Optionally, a transaction certificate may be attached to the message. The message may also be digitally signed. The encrypted message is then sent, using conventional means, via Public Network (1) to the Message Center (5). The sending of the message may be accomplished by a standard email protocol such as SMTP or may be accomplished using an alternate secure protocol, such as HTTPS.

When the Message Center (5) receives the encrypted message, Message Center (5) decrypts the message using the Encryption/Decryption Engine (23) at step 209. More specifically, the private key of the Message Center (5) is used to recover the symmetric key encrypted by the public key, and then the symmetric key is used to decrypt the message. Optionally, the Message Center (5) may verify the digital signature of the Sender Gateway (6) and the transaction certificate that may be attached to the message. After the Message Center (5) has decrypted the message, the Message Center (5) stores the message in the Message Storage (26). The stored messages may again be encrypted to prevent unauthorized access. Each stored message may have an expiration time after which the message will be purged from the Message Storage (26) to save storage space or to permanently erase the outdated messages. In one implementation, a notification email may be sent to the final recipient (Message Center Recipient (10)) to let him/her know that a message is at the Message Center (5) waiting to be picked up.

When the Message Center Recipient (10) picks up the message stored at the Message Center (5), the Web Browser (29) is launched and connected to the Message Center (10) via, for example, SSL at step 210. The Message Center (5) then converts the message into an appropriate format (e.g., HTML format) and sends the formatted message to the Web Browser (29). The Web Browser (29) then displays the message to the recipient. This finishes the delivery for case (c). In one implementation, the access to the messages sent to a particular Message Center Recipient (10) is controlled by a password account. If the Message Center Recipient (10) does not have a password account yet, a signup procedure can be initiated to establish such an account when the Message Center Recipient (10) accesses the Message Center (5) for the first time. In one implementation, a receipt is sent back to the original sender that shows the date and time that the message was opened by Message Center Recipient (10). In another implementation, a message not picked up by the intended recipient within a specified time period may cause a notification to be sent to the original sender stating such. For example, a healthcare company sending important laboratory results to a patient will need to be notified if the patient does not receive the results. Alternatively, the message center may deliver the message to the intended recipient through other means, including direct communication. For example, although the Message Center Recipient (10) does not have a public key in Key/Certificate Server (4), he or she may have a different type of public key in another PKI system. In such a case, the Message Center (5) may be connected to that PKI system to retrieve the recipient's public key. In this scenario, the Message Center (5) can forward the message to the recipient directly (encrypted with the recipient's public key).

Figure 4:
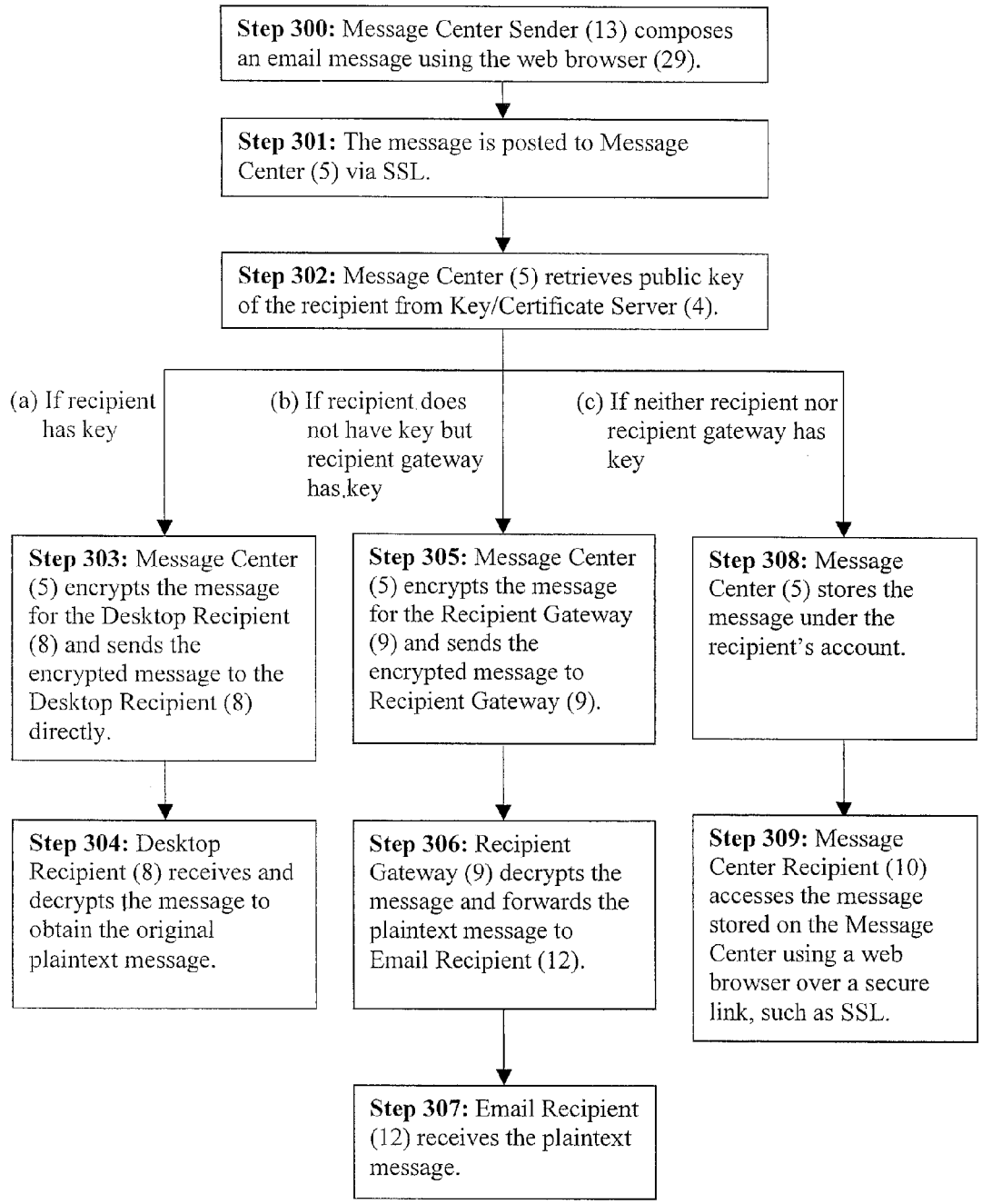
FIG. 4 shows a method for secure delivery of content by a sender who sends via a message center.

Referring now to FIGS. 1 and 4, a method is described for a delivery process when a message is originated from a Message Center Sender (13). At step 300, the Message Center Sender (13) composes an email message using the Browser (29). At step 301, the Message Center Sender (13) sends the message to the Message Center (5), for example, via SSL. In one implementation, the message is composed on a Web form that looks like an email compose form.

At step 302, Sender Gateway (6) performs a step, essentially identical to step 101 of FIG. 2, to locate the public key of the recipient or the recipient's gateway. This step is the same, except it are carried out by the Message Center (5) instead of the Desktop Sender (7).

More specifically, and assuming that the sender did not request a pick up receipt, at step 302, the Message Center (5) tries to retrieve the public key of the recipient from the Key/Certificate Server (4). This may produce 3 different results: a) the recipient's (e.g., the Desktop Recipient's (8)) public key is found; b) the recipient's (e.g., the Email Recipient's (12)) public key is not found, but the Recipient's Gateway (9) public key is found; and, c) neither the recipient's public key nor the Recipient's Gateway (9) public key is found.

If the Desktop Recipient's public key is found (case a), the Message Center (5) will retrieve the public key of Desktop Recipient (8). Optionally, Message Center (5) may retrieve a certificate to certify that the Desktop Recipient's (8) public key is authentic. In one implementation, the certificate is a transaction certificate that certifies the public keys of Message Center (5) and Desktop Recipient's (8), the hash of the message, as well as the time of the message. In another implementation, depending upon the requirements of Desktop Recipient's (8) corporate policies, the symmetric key used to encrypt the message can separately be encrypted by Recipient's Gateway (9) public key and included within the message package that is sent to the Desktop Recipient (8), thus allowing the Desktop Recipient's (8) corporation to open and read the encrypted message should, for example, a court order be issued requiring same.

If the Email Recipient's (12) public key is not found, indicating that the Email Recipient (12) cannot receive encrypted messages directly, a check is made to locate the Recipient's Gateway (9) public key. If the public key of the Recipient's Gateway (9) is found, the Email Recipient (12) is able to receive the encrypted message through the Recipient Gateway (9) (case b). In this case, the Message Center (5) will retrieve the public key of the Recipient Gateway (9). Optionally the Message Center (5) may receive a certificate to certify that the public key of Recipient Gateway (9) is authentic. In one implementation, the certificate is a transaction certificate that certifies the public keys of Message Center (5) and Recipient Gateway (9), the hash of the message, as well as the time of the message.

If neither the Email Recipient's (12) public key or the Recipient Gateway's (9) public key is found, the recipient cannot directly receive encrypted messages and is not securely reachable through a gateway (case c). In this case, the message is stored in the Message Storage (26).

At step 303, (this step is carried out when the public key of the Desktop Recipient (8) is found (case (a) in step 302), the Message Center (5) encrypts the message for the recipient using Encryption/Decryption Engine (23). More specifically, the public key of the recipient is used to encrypt a randomly generated symmetric key, and the symmetric key is used to encrypt the message. An example of public key encryption is RSA. An example of the symmetric key encryption is Triple-DES. Optionally, a transaction certificate may be attached to the message. The message may also be digitally signed. The encrypted message is then directly sent, using conventional means, via Public Network (1) to the Desktop Recipient (8). When the Desktop Recipient (8) receives the encrypted message at step 304, the Desktop Recipient (8) decrypts the message using the Encryption/Decryption Engine (23). More specifically, the recipient's private key is used to recover the symmetric key encrypted by the public key, and then the symmetric key is used to decrypt the message. Optionally, the Desktop Recipient (8) may verify the digital signature of the Message Center (5) and verify the transaction certificate that may be attached to the message. In one implementation, a certified receipt may be returned to the Message Center (5) using methods described in the "CERTIFIED TRANSMISSION SYSTEM." The receipt may be stored in the sender's account, or forwarded directly to the sender. In one implementation, when the sender has requested a pick up receipt from Message Center (5), all steps involving forwarded messages using public key encryption methods can be skipped. This completes the delivery process for case (a).

When the Email Recipient's (12) public key is not found but the Recipient's Gateway (9) public key is found on the Key/Certificate Server (4) (case (b) in step 302), the Message Center (5) encrypts the message for the Recipient Gateway (9) at step 305. More specifically, the public key of the Recipient Gateway (9) is used to encrypt a randomly generated symmetric key, and the symmetric key is used to encrypt the message. Optionally, a transaction certificate may be attached to the message. The message may also be digitally signed. The encrypted message is then sent, using conventional means, via the Public Network (1) to the Recipient Gateway (9).

When the Recipient Gateway (9) receives the encrypted message, the Recipient Gateway (9) decrypts the message using the Encryption/Decryption Engine (23) at step 306. More specifically, the private key of the Recipient Gateway (9) is used to recover the symmetric key encrypted by the public key, and then the symmetric key is used to decrypt the message. Optionally, the Recipient Gateway (9) may verify the digital signature of the Message Center (5) and verify the transaction certificate that may be attached to the message. After the Recipient Gateway (9) has decrypted the message, the non-encrypted message can be forwarded along to the Email Recipient (12). It is possible that a message received by the Recipient Gateway (9) is not encrypted for the Recipient Gateway (9), but is encrypted for a Desktop Recipient (8) on Corporate Network (3) behind the Recipient Gateway (9). If the Recipient Gateway (9) recognizes such a case, the gateway can simply pass the encrypted message through to the Desktop Recipient (8) without trying to decrypt the message. In the event that a second copy of the message's symmetric encryption key is available to Gateway (9) by use of Gateway (9)'s private key, one skilled in the art will easily see that the Recipient Gateway (9), can decrypt the incoming message and have the ability to scan for viruses, filter out offensive material, and perform other functions before ultimately forwarding the message to the final recipient, even if the forwarded message is in the original encrypted form. In one implementation, a "certified receipt" may be returned to the Message Center (5) in accordance with the methods described in the "CERTIFIED TRANSMISSION SYSTEM." At step 307, the Email Recipient (11) receives the non-encrypted message. This finishes the delivery process for case (b).

When neither the Email Recipient (12) nor the Recipient's Gateway (9) has a key on Key/Certificate Server (4) (Situation (c) in step 202), the Message Center (5) stores the message under an account associated with the recipient at step 308. The stored messages may again be encrypted to prevent unauthorized access. Each stored message may have an expiration time after which the message will be purged from the Message Storage (26) to save storage space or to permanently erase the outdated messages. In one implementation, a notification email may be sent to the final recipient (Message Center Recipient (10)) to let him/her know that a message is at the Message Center (5) waiting to be picked up. In another implementation, a message not picked up by the intended recipient within a specified time period may cause a notification to be sent to the original sender stating such.

When the Message Center Recipient (10) picks up the message stored at the Message Center (5), the Web Browser (29) is launched and connected to the Message Center (10) via, for example, SSL at step 309. The Message Center (5) then converts the message into an appropriate format (e.g., HTML format) and sends the formatted message to the Web Browser (29). The Web Browser (29) then displays the message to the recipient. This finishes the delivery for case (c). In one implementation, the access to the messages sent to a particular Message Center Recipient (10) is controlled by a password account. If the Message Center Recipient (10) does not have a password account yet, a signup procedure can be initiated to establish such an account when the Message Center Recipient (10) accesses the Message Center (5) for the first time. In one implementation, a receipt is sent back to the original sender that shows the date and time that the message was opened by Message Center Recipient (10). Alternatively, the message center may deliver the message to the intended recipient through other means, including direct communication. In one implementation, the message opened by Message Center Recipient (10) may by replied to, forwarded, or otherwise processed beyond just the viewing or reading of the message. In another implementation where the message has content of value, such as a copyrighted piece of music, Message Center Recipient (10) may be required to authorize purchase of the content before receiving the compete message content.

Alternative Delivery Options

In the methods described above, delivery is attempted in the following order: direct delivery to a desktop recipient, delivery through a recipient gateway, and delivery through a message center. Alternative delivery options are possible depending on what is interpreted as "best" for a given communication system. For example, if virus scanning, filtering, and monitoring email messages at the gateway are viewed as more important than protecting the secrecy of the content, a communication system can be configured that opts to try delivery through a recipient gateway first, before trying delivery to a desktop recipient directly. In another example, message secrecy may not be very important, but it may be desirable to obtain a pick up receipt from a message center when the recipient picks up a message. In such a case, delivery through a message center may be the first option to try, and because this will always succeed, the other two delivery options will not be tried. The order of delivery options to try may not be fixed and may depend on the sender's choice. The sender's choice may further depend on who the recipient is and the subject as well as the content of the message (e.g. containing certain key words or certain file attachments).

Alternatively, the communication system can be configured dynamically depending upon the sender's or the recipient's choices. The combination of the message, the sender, and the recipient can be analyzed to determine a best delivery method along with ordering of alternative delivery options. Other factors can also be considered including the location of the sender or the recipient, the sensitivity of the information being transmitted and the like.

Further, the communication system can be configured to log, drop or otherwise process messages that are scanned and determined to include inappropriate, unwanted or otherwise unauthorized content. The scanning and processing can occur at a sender gateway, the message center or the recipient's gateway.

While this invention has been described in terms of several preferred implementations, it is contemplated that alterations, modifications and permutations thereof will become apparent to those skilled in the art upon a reading of the specification and study of the drawings. Furthermore, certain terminology has been used for the purposes of descriptive clarity, and should not be construed to limit the invention. It is therefore intended that the following appended claims include all such alterations, modifications and permutations as fall within the true spirit and scope of the present invention.

What is claimed is:

1. A method for secure delivery of a message in a communication system comprising:
    automatically identifying a method for delivery of a message wherein the message is an email message and wherein the method is selected from among three supported delivery methods including direct, gateway and Web browser-accessible message center delivery methods, wherein automatically identifying includes:
        identifying preferences for delivery of the sender and the recipient including determining an availability of security parameters for securing content of the message, wherein the security parameters include a recipient key and a recipient gateway key; and
        automatically determining, by one or more processors, a preferred ordering from among the three supported delivery methods including when to first send the message directly to the recipient, when to first send the message through a gateway and when to notify the recipient to retrieve the message at the Web browser-accessible message center based on the sender, recipient and availability;
    attempting delivery of the message based on the preferred ordering, determining when message delivery is not available using a first method of the three supported delivery methods in accordance with the preferred ordering, attempting another delivery of the message based on the preferred ordering using a second method, determining when the another delivery is not available using the second method, and delivering the message based on preferred ordering using a third method in accordance with the preferred ordering.

2. The method of claim 1 wherein the direct delivery includes encrypting the message using public key encryption and retrieving a public key for the recipient to encrypt the message.

3. The method of claim 1 wherein the gateway delivery method includes encrypting the message using public key encryption, encrypting the message using the public key of a recipient gateway that is coupled between the sender and the recipient, delivering the message encrypted to a recipient's gateway, and decrypting the message at the recipient's gateway prior to sending the message to the recipient.

4. The method of claim 3 further comprising scanning the decrypted message at the recipient's gateway for inappropriate, unwanted or unauthorized content.

5. The method of claim 4 further comprising dropping the message if the scanning step detects inappropriate, unwanted or unauthorized content.

6. The method of claim 5 further comprising logging the detected content.

7. The method of claim 1 wherein the gateway delivery method includes
    directing the message from the sender to a sending gateway;
    scanning the message for disclosure of corporate secrets or sensitive information; and
    processing the message if the scanning step detects disclosure of corporate secrets or sensitive information.

8. The method of claim 7 wherein processing includes dropping the message.

9. The method of claim 7 wherein processing includes logging the message.

10. The method of claim 1 wherein a delivery method selected is based at least in part on whether the message contains: corporate secrets or sensitive information.

* * * * *